(12) United States Patent
Fukushima et al.

(10) Patent No.: US 7,480,439 B2
(45) Date of Patent: Jan. 20, 2009

(54) RECORDING DEVICE RECORDING METHOD AND PROGRAM

(75) Inventors: Toshiyuki Fukushima, Hirakata (JP); Yoshiho Gotoh, Osaka (JP); Takuya Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 783 days.

(21) Appl. No.: 10/504,300

(22) PCT Filed: Mar. 25, 2003

(86) PCT No.: PCT/JP03/03564

§ 371 (c)(1), (2), (4) Date: Aug. 12, 2004

(87) PCT Pub. No.: WO03/081588

PCT Pub. Date: Oct. 2, 2003

(65) Prior Publication Data

US 2005/0089302 A1    Apr. 28, 2005

(30) Foreign Application Priority Data

Mar. 25, 2002    (JP) ............................ 2002-082616

(51) Int. Cl.
*H04N 5/91* (2006.01)
*H04N 5/00* (2006.01)

(52) U.S. Cl. .................... 386/46; 386/125; 386/126

(58) Field of Classification Search .............. 386/46, 386/95, 125–126, 83
See application file for complete search history.

(56) References Cited

U.S. PATENT DOCUMENTS

| | | | |
|---|---|---|---|
| 6,032,202 A | 2/2000 | Lea et al. | |
| 6,052,750 A | 4/2000 | Lea | |
| 6,085,236 A | 7/2000 | Lea | |
| 6,169,725 B1 | 1/2001 | Gibbs et al. | |
| 6,233,611 B1 | 5/2001 | Ludtke et al. | |
| 6,275,865 B1 | 8/2001 | Zou | |
| 6,311,011 B1* | 10/2001 | Kuroda | 386/46 |
| 6,349,352 B1 | 2/2002 | Lea | |
| 6,393,201 B1* | 5/2002 | Sakuramoto et al. | 386/95 |

(Continued)

FOREIGN PATENT DOCUMENTS

EP    0 940 985    9/1999

(Continued)

OTHER PUBLICATIONS

AV/C Descriptor Mechanism Specification 1.1, TA Document 2001021, Feb. 20, 2002, pp. 60-111.

*Primary Examiner*—Thai Tran
*Assistant Examiner*—Tat Chi Chio
(74) *Attorney, Agent, or Firm*—Wenderoth, Lind & Ponack, L.L.P.

(57) ABSTRACT

A recording device records various items of information onto a removable medium. The recording device includes a medium unit in which a removable medium is set, an obtaining unit that obtains information from an external source, a specifying unit that specifies an item of information whose recording detail is defined by a data format of the removable medium that is set in the medium unit, and a recording unit that judges whether an item of the information obtained by the obtaining unit matches the item specified by the specifying unit and records the obtained information onto the removable medium when judging affirmatively and onto another medium when judging negatively.

19 Claims, 10 Drawing Sheets

U.S. PATENT DOCUMENTS 6,473,379 B1 * 10/2002 Kim et al. .................. 369/59.1
2001/0018718 A1    8/2001 Ludtke et al.

FOREIGN PATENT DOCUMENTS

| EP | 1 227 479 | 7/2002 |
| JP | 2001-57026 | 2/2001 |
| WO | 02/43066 | 5/2002 |

* cited by examiner

RECORDING DEVICE RECORDING METHOD AND PROGRAM

BACKGROUND OF THE INVENTION

1. Field of the Invention

The present invention relates to a recording device that records video data and the like onto a removable medium.

2. Background of the Related Art

Digital recorders have recently been developed and commercialized for digitally recording audio and video data (AV data) of broadcast programs transmitted by digital broadcasting services. A digital recorder is typically used as being connected via an IEEE 1394 interface to a digital TV (hereafter, a "DTV") or the like that receives digital broadcasts. The IEEE 1394 enables AV data etc., requiring a real-time transfer, to be transferred between devices using an isochronous transfer method, and enables control data to be transferred between devices using an asynchronous transfer method. For the transfer of control data, AV/C commands specified by the 1394 Trade Association are used.

The AV/C commands are a command set used by an AV device for remote-controlling another AV device connected via the IEEE 1394. Here, a device such as a DTV that performs remote-control, i.e., a device that issues a command, is referred as a "controller", where as a device such as a digital recorder that is remote-controlled, i.e., a device that receives a command, is referred to as a "target". Examples of AV/C commands used by the controller include: commands to control the target's functions including playback and recording of AV data etc. and writing and reading of information about the AV data; and commands to query the current status of the target.

These AV/C commands can realize various applications, one of which is described below. The DTV issues anAV/C command to the digital recorder, so as to read various information about AV data of each broadcast program, such as a title name, recording date and time, and program outline. The DTV arranges and displays the read information, so that the user can select a broadcast program he or she wants by referring to the displayed information. Upon receipt of a user selection of a broadcast program, the DTV issues an AV/C command to instruct the digital recorder to play back AV data of the broadcast program.

The following describes one example of the processing flow of this application.

The DTV receives AV data of broadcast programs transmitted via digital broadcasting services, and obtains information about AV data of each broadcast program, such as a title name, recording date and time, and program outline from an EPG (electric program guide) transmitted together with the AV data. Such information about AV data of each broadcast program is hereafter referred to as "program information" in this specification. The DTV then transfers, to the digital recorder, the received AV data of broadcast programs and the obtained program information, together with an AV/C command that instructs the digital recorder to write them therein.

Upon receipt of this AV/C command, the digital recorder records the transferred AV data and the program information onto its recording medium.

After the digital recorder completes the recording, the DTV issues an AV/C command that instructs the digital recorder to read all program information stored in the recording medium.

Upon receipt of this AV/C command, the digital recorder transmits all program information stored in the recording medium to the DTV.

The DTV receives the program information, and generates a program list listing title names, program outlines, etc., of broadcast programs, based on the received program information. The DTV then displays the program list for user selection.

Upon receipt of a user operation selecting one broadcast program in the program list, the DTV specifies AV data of the broadcast program. Then, the DTV instructs the digital recorder to read the AV data of the broadcast program. The DTV receives the AV data of the broadcast program from the digital recorder, and plays back the received AV data.

In the above application, a problem may arise when the recording medium of the digital recorder is an optical disc. Optical discs of different types often employ different data formats. The problem is therefore that compatibility may not be maintained between the DTV and a certain type of optical disc.

Here, the data format of an optical disc defines items of program information that can be recorded on the optical disc, a recording area of each item, and a size of a recording area of each item. As examples, a DVD-RAM and a DVD-RW employ the DVD Video recording format, where as a DVD-R and a DVD-ROM employ the DVD Video format.

The above problem of incompatibility occurs when the DTV, and an optical disc loaded in the digital recorder employ different data formats and items of program information defined by the data format of the DTV are not defined by the data format of the optical disc. In this case, the digital decoder cannot record certain items of program information onto the optical disc even if instructed to do so by the DTV with the use of an AV/C command. As a result, the digital decoder cannot read such items of program information from the optical disc at the time when instructed to do so by the DTV with the use of an AV/C command. Accordingly, the DTV fails to obtain and display these items of program information.

In particular, optical discs with a large capacity that have been developed in recent years employ the data format defining various items of data that are not defined by the existing data formats. Therefore, the above problem of incompatibility is even more serious between devices complying with such large-capacity optical discs and the existing optical discs. To solve this problem, one method is to enable the DTV to identify the data format of an optical disc currently loaded in the digital recorder and switch AV/C commands to be issued to the digital recorder in accordance with the identified data format. With this method, the DTV may suffer from degraded development efficiency of applications.

BRIEF SUMMARY OF THE INVENTION

To solve the above problems, the object of the present invention is to provide a digital recorder that is free from the above problem of incompatibility, without requiring a controller such as a DTV to switch commands in accordance with a data format of an optical disc loaded in the digital recorder.

The above object can be achieved by a recording device that records various items of information onto a removable medium, and includes a medium unit in which a removable medium is set, an obtaining unit operable to obtain information from an external source, a specifying unit operable to specify an item of information whose recording detail is defined by a data format of the removable medium that is set in the medium unit, and a recording unit operable to judge whether an item of the information obtained by the obtaining unit matches the item specified by the specifying unit, and record the obtained information (i) onto the removable medium when judging affirmatively, and (ii) onto another medium when judging negatively.

According to this construction, when the recording device receives all items of information defined by the data format of an external device (e.g., DTV) together with an instruction to record the items of information, the recording device can record, without fail, all the items of information onto a removable medium or another medium. At the time of recording, the external device is neither required to recognize items of information allowed to be recorded and items of information not allowed to be recorded according to the data format of the removable medium loaded in the recording device, nor required to switch commands for instructing the recording in accordance with the recognition.

The recording device of the present invention may further include an instruction obtaining unit operable to obtain, from the external source, an instruction to read predetermined information, and a reading unit operable to output the predetermined information relating to the instruction to the external source, by reading the predetermined information (i) from the removable medium when the predetermined information is recorded on the removable medium, and (ii) from the other medium when the predetermined information is not recorded on the removable medium but is recorded on the other medium.

According to this construction, even when the recording device is instructed by an external device to read an item of information that is not defined by the data format of the removable medium, the recording device can respond to the instruction of the external device by reading such an item of information, if stored therein, from the other recording medium. Also, the external device is neither required to recognize items of information defined by the data format of the removable medium, nor required to switch commands for instructing the reading in accordance with the recognition.

The recording device of the present invention may further include a pseudo-information generating unit operable to generate pseudo information and output the pseudo information instead of the predetermined information to the external source, when the predetermined information relating to the instruction is recorded neither on the removable medium nor on the other medium.

According to this construction, even when the recording device is instructed by an external device to read an item of information that is recorded neither on the removable medium nor on the other recording medium, the recording device can respond to the instruction of the external device by generating pseudo information.

Here, the pseudo-information generating unit may be operable to generate the pseudo information based on information recorded on the removable medium or on the other medium.

According to this construction, the pseudo-information generating unit can generate pseudo information relating to information recorded on the removable medium or the other recording medium.

The recording device of the present invention may further include a notifying unit operable to output a notification signal to the external source after the recording unit completes recording onto the removable medium or onto the other medium, the notification signal indicating that the recording unit has performed the recording.

Here, a type of the removable medium to be set therein may be at least one of a DVD-RAM, a DVD-R, a DVD-ROM, and a DVD-RW.

Here, a signal may be transmitted and received to and from the external source via a digital interface.

The digital interface may be one of IEEE 1394, USB, and Ethernet.

Also, the other medium may be one of a flexible disk, a hard disk, an MO, and a semiconductor memory.

According to this construction, the recording device can be applied to such a case where a plurality of removable mediums are loaded in and out. To be more specific, the recording device can write, to the other recording medium, items of information that are not allowed to be recorded on each removable medium, in association with a disc identifier of the removable medium.

The recording device of the present invention may further include a disc identifier obtaining unit operable to obtain a disc identifier of the removable medium that is set in the medium unit, when the recording unit performs recording onto the other medium. Here, when the recording unit records the information, whose item does not match the item specified by the specifying unit, onto the other medium, the recording unit records the information in association with the disc identifier obtained by the disc identifier obtaining unit.

According to this construction, even when items of information corresponding to a plurality of removable mediums are recorded in the other recording medium, the recording device can specify and read items of information corresponding to the currently loaded removable medium, using a disc identifier of the currently loaded removable medium.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DETAILED DESCRIPTION OF THE INVENTION

Figure 1:
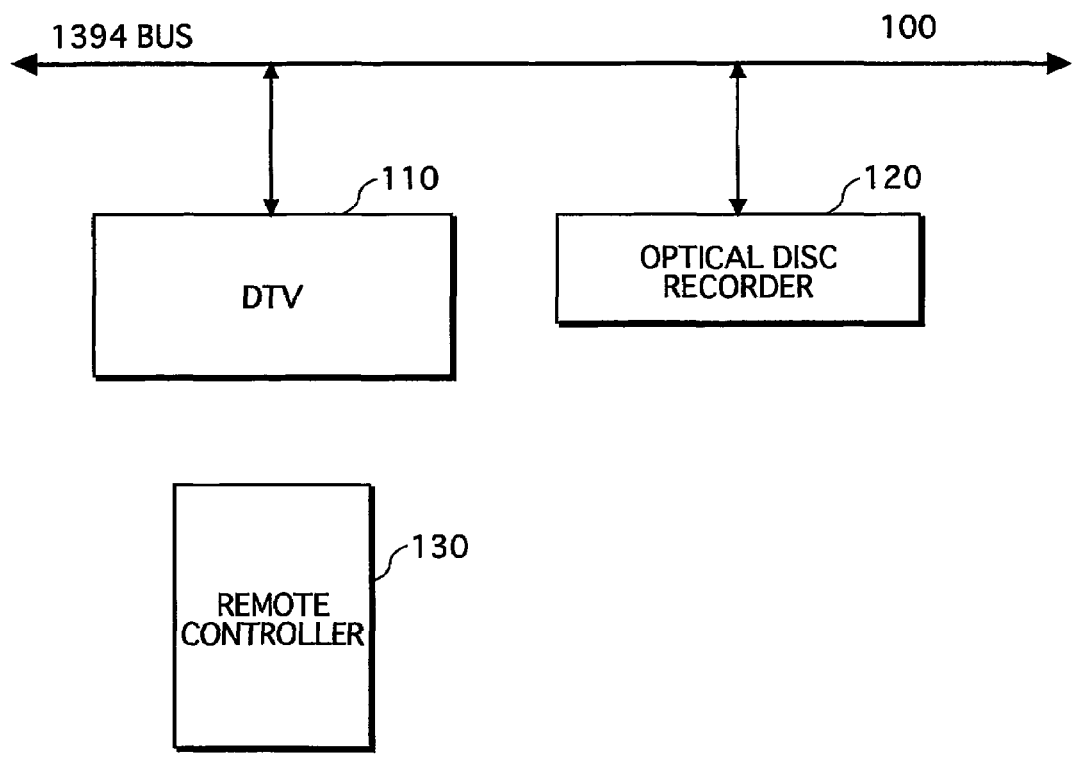
FIG. 1 shows an example of a network including a DTV 110 and an optical disc recorder 120.

FIG. 1 shows an example of a network including a DTV and an optical disc recorder.

In the figure, a DTV 110 and an optical disc recorder 120 are connected via an IEEE 1394 bus 100. A remote controller 130 receives a user operation, and issues an instruction to the DTV 110 according to the user operation.

Figure 2:
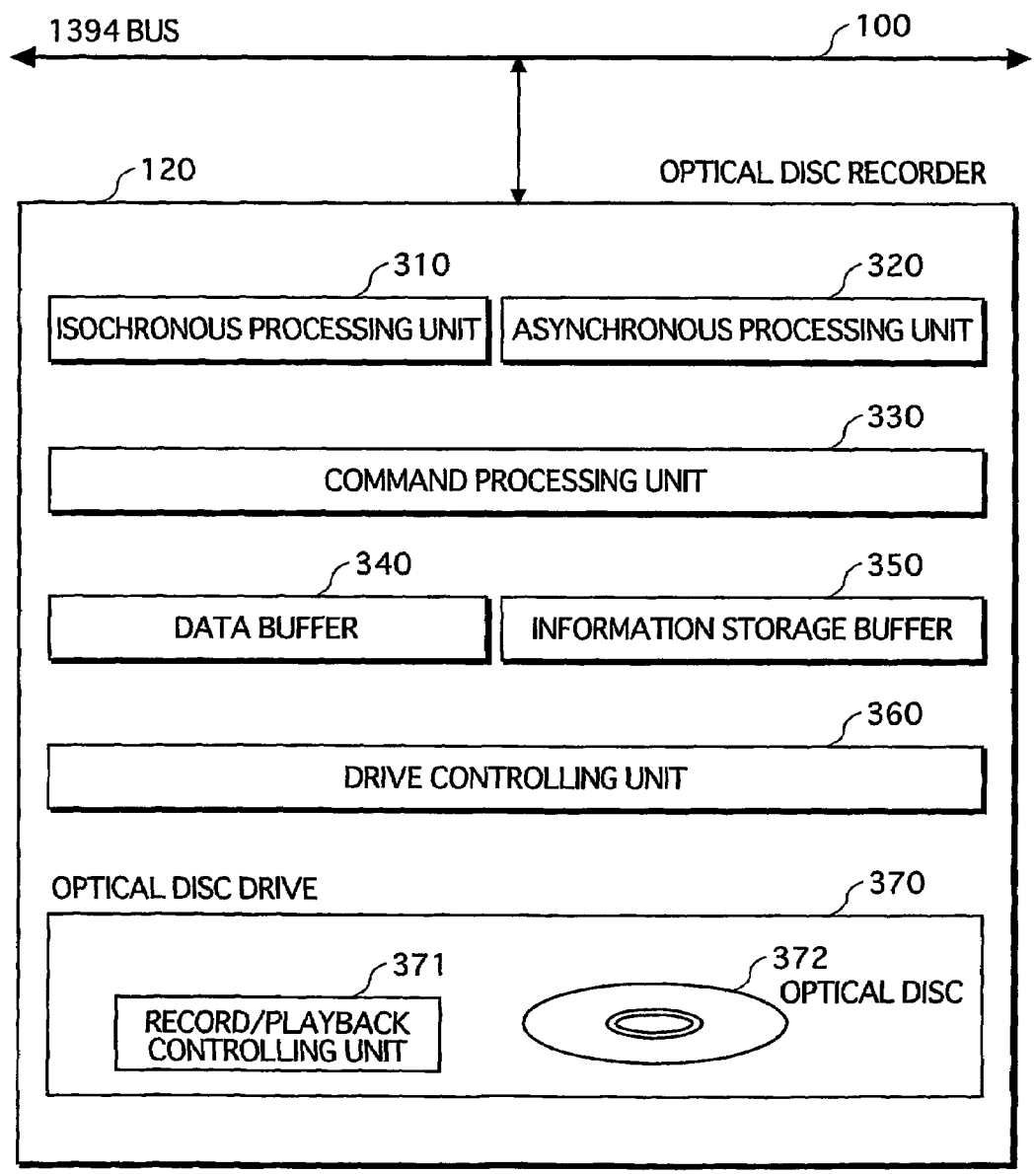
FIG. 2 shows an example construction of the optical disc recorder 120.

FIG. 2 shows an example construction of the optical disc recorder 120.

As shown in FIG. 2, the optical disc recorder 120 includes an isochronous processing unit 310 that controls an isochronous transfer, an asynchronous processing unit 320 that controls an asynchronous transfer, a command processing unit 330 that processes an AV/C command, a data buffer 340 that temporarily stores AV data, an information storage buffer 350, a drive controlling unit 360 that controls an optical disc drive 370.

The information storage buffer 350 is a storage medium for storing items of program information that are not defined by the data format determined in advance for the optical disc 372 loaded in the optical disc drive 370.

This storage medium may be realized by a flexible disk, a hard disk, an MO, or a semiconductor memory.

The optical disc drive 370 includes a record/playback controlling unit 371 that controls recording and playback of the optical disc 372 loaded therein.

Types of the optical disc 372 to be loaded in the optical disc drive 370 are a DVD-RAM, a DVD-R, a DVD-ROM, a DVD-RW, etc.

Figure 3:
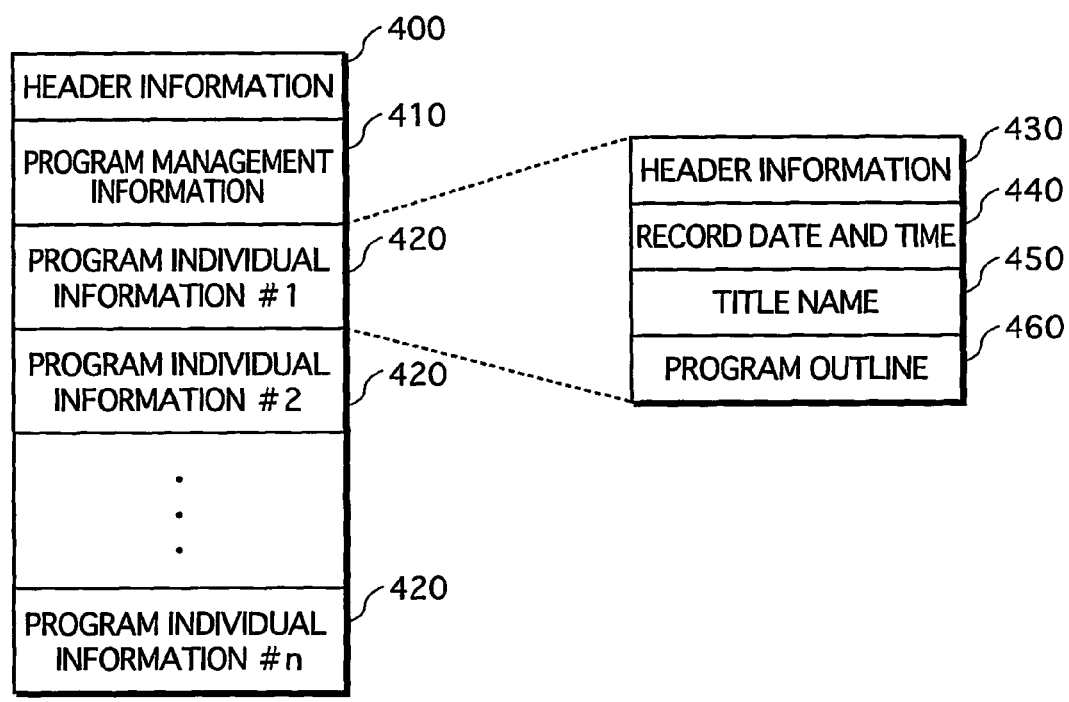
FIG. 3 shows an example data structure of program information transferred from the DTV 110 to the optical disc recorder 120 with the use of an AV/C command.

FIG. 3 shows an example data structure of program information that is transferred from the DTV 110 to the optical disc recorder 120 with the use of an AV/C command. As defined above, the "program information" is information about AV data of broadcast programs.

As shown in FIG. 3, the program information is made up of header information 400, program management information 410, and one or more pieces of program individual information 420 provided in one-to-one correspondence with programs (more specifically, AV data) to which this program information relates. The header information 400 is information about a size etc. of the entire program information. The program management information 410 is information about all the programs. Each piece of program individual information 420 is detailed information about the corresponding program.

Each piece of program individual information 420 is made up of a header 430 that shows a size etc. of the piece of program individual information, and items of information about the corresponding program. The items of information included herein are: a recording date and time 440; a title name 450; and a program outline 460.

It should be noted here that items included in the program individual information 420 may not be limited to the above listed items, but a channel name or other items may be included. It should also be noted here that "#n" (n is a natural number) is a number given to each piece of program individual information for the purpose of identification. Here, the DTV 110 may transfer, for example, only the program individual information #1, or may transfer the entire program information to the optical disc recorder 120.

Figure 4:
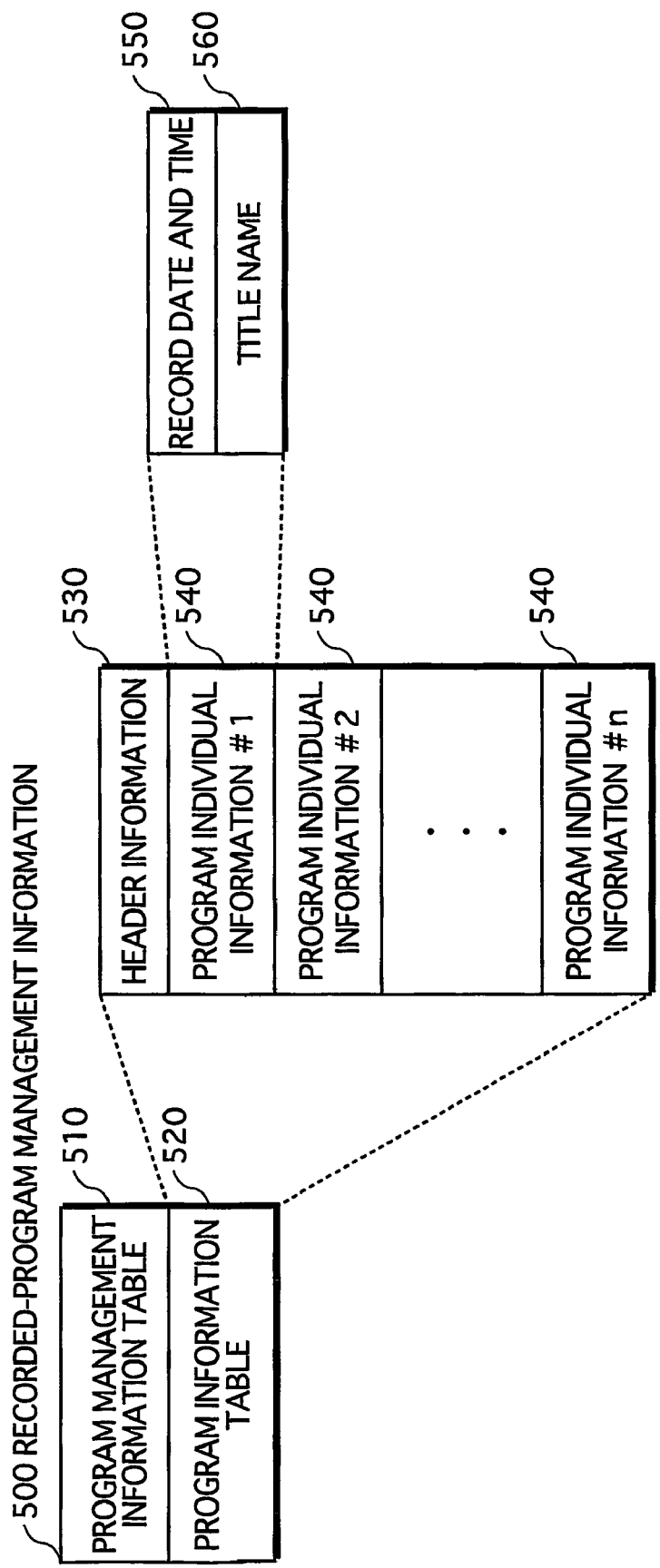
FIG. 4 shows an example data structure of recorded-program management information 500 defined by the data format of an optical disc 372.

FIG. 4 shows an example structure of recorded-program management information 500 defined by the data format of the optical disc 372.

The recorded-program management information 500 is defined as an area for storing information about programs (more specifically, AV data), and is made up of a program management information table 510 and a program information table 520. The program management information table 510 is provided for managing all the programs (the entire AV data) recorded on the optical disc 372. The program information table 520 is provided for storing program information, i.e., information about each program. The program information table 520 is made up of header information 530, and one or more pieces of program individual information 540 provided in one-to-one correspondence with the programs. The header information 530 is information about a size etc. of the program information table. Each piece of program individual information 540 is information about the corresponding program. Each piece of program individual information 540 is made up of items of information about the corresponding program, namely, a recording date and time 550, and a title name 560.

Although not shown in FIG. 4, the data format of the optical disc 372 also defines an area for storing AV data, besides the area of the recorded-program management information 500.

As can be known by comparing the data formats in FIGS. 3 and 4, the data format of the optical disc 372 in FIG. 4 defines the recording date and time 550 and the title name 560 that correspond to the recording date and time 440 and the title name 450 defined by the data format of the DTV 110 in FIG. 3, but does not define an item corresponding to the program outline 460 in FIG. 3.

To be more specific, this digital format allows these two items "recording date and time" and "title name", to be recorded onto the optical disc 372, but does not allow the item "program outline" to be recorded onto the optical disc 372.

It should be noted here that items of information allowed or not allowed to be recorded on the optical disc 372 according to its data format should not be limited to the examples shown in FIG. 4.

Figure 5:
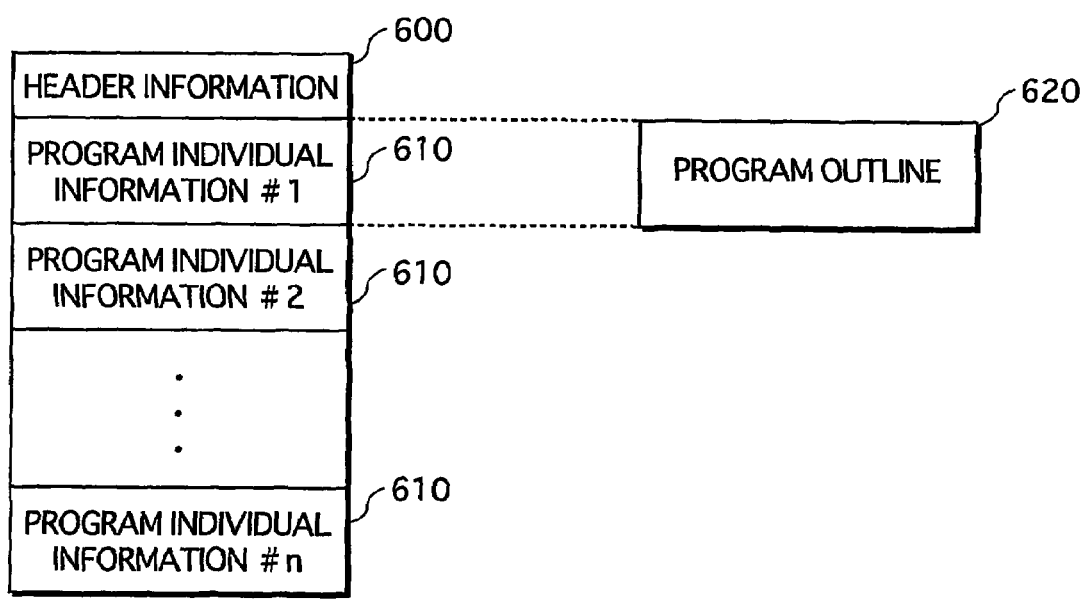
FIG. 5 shows an example data structure of program information to be stored in an information storage buffer when the optical disc 372 having the data format shown in FIG. 4 is loaded.

FIG. 5 shows an example data structure of program information to be stored in the information storage buffer 350 when the optical disc 372 having the data format shown in FIG. 4 is loaded in.

The information storage buffer 350 is made up of header is information 600 that is information about the number etc. of programs to which this program information relates, and one or more pieces of program individual information 610 provided in one-to-one correspondence with the programs. Each piece of program individual information 610 is made up of an item of information about the corresponding program, namely, a program outline 620.

It should be noted here that in FIGS. 3, 4, and 5, items of information that make up a piece of program individual information with the same number are the same information. To be more specific, the recording date and time 440 and the title name 450 that make up the program individual information #1 in FIG. 3 are respectively the same information as the recording date and time 550 and the title name 560 that make up the program individual information #1 in FIG. 4. In the same manner, the program outline 460 that makes up the program individual information #1 in FIG. 3 is the same information as the program outline 620 that makes up the program individual information #1 in FIG. 5.

The following describes recording of program information.

Figure 6:
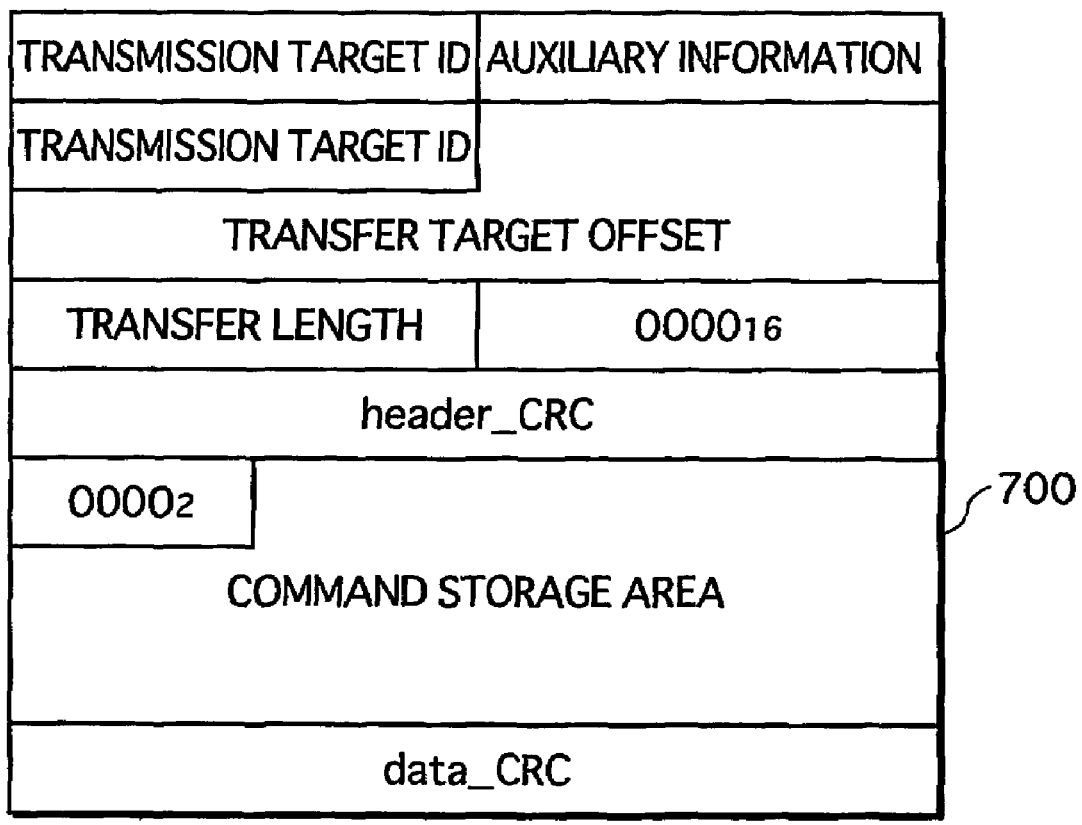
FIG. 6 shows a format of FCP transmitted from the DTV 110 to the optical disc recorder 120.

FIG. 6 shows a format of FCP (Fiber Channel Protocol) transmitted from the DTV 110 to the optical disc recorder 120.

The FCP is a protocol employed for an AV/C command to control an AV device on the IEEE 1394.

Figure 7:
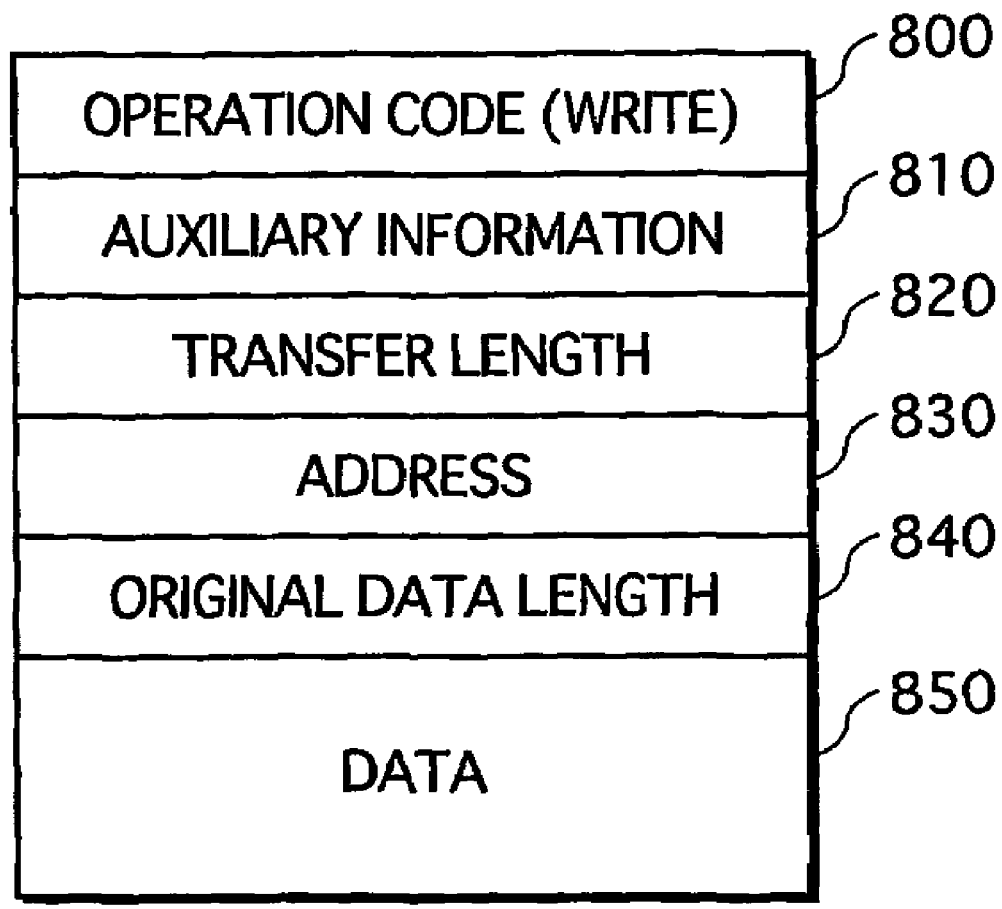
FIG. 7 shows the data structure of an AV/C command that instructs recording.

FIG. 7 shows the data structure of an AV/C command that instructs recording.

As shown in FIG. 7, the AV/C command is made up of an operation code 800, auxiliary information 810, a transfer length 820, an address 830, an original data length 840, and data 850. The operation code 800 indicates the content of the instruction (to write). The auxiliary information 810 is information relating to the content of the instruction. The transfer length 820 indicates the size of data to be transmitted. The address 830 indicates a location at which the data is to be stored. The original data length 840 indicates a length of data to be stored. The data 850 is data to be transmitted (program information in the present case).

The AV/C command shown in FIG. 7 is transferred as being stored in the command storage area 700 of the FCP format in FIG. 6.

The following describes the processing performed by the optical disc recorder 120, upon receipt of an instruction (AV/C command) to record items of program information transferred using the data structure shown in FIGS. 6 and 7.

Figure 8:
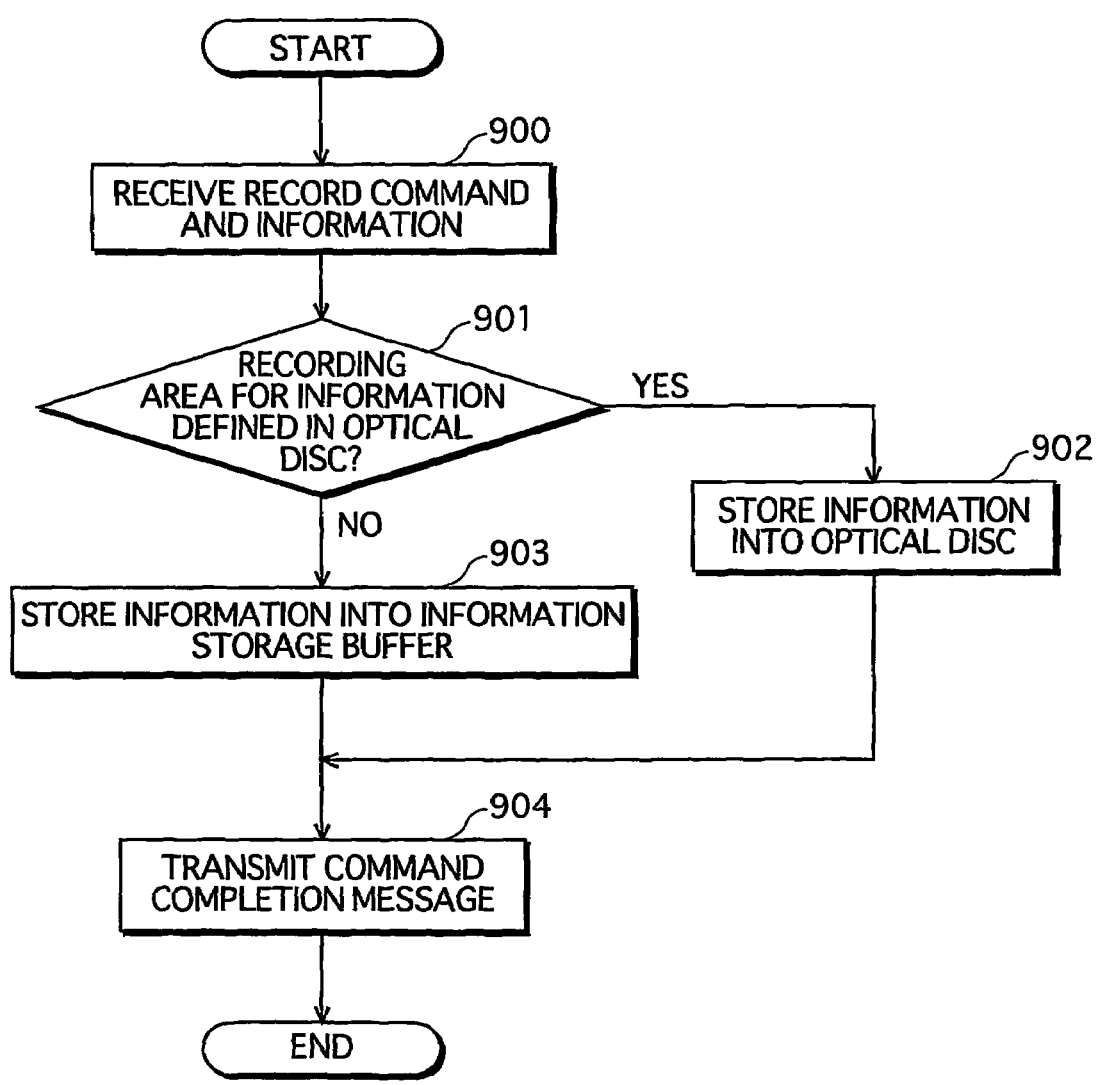
FIG. 8 is a flowchart showing a recording process performed by the optical disc recorder 120 for recording program information.

FIG. 8 is a flowchart showing a recording process performed by the optical disc recorder 120 to record items of program information.

The optical disc recorder 120 receives the AV/C command and the items of program information transferred from the DTV 110, via the asynchronous processing unit 320 (step S900).

The command processing unit 330 then obtains the AV/C command from the command storage area 700, analyzes the operation code 800 etc, to determine which processing to be performed. The command processing unit 330 obtains the items of program information that make up the program individual information 420, and judges, for each item, whether an area in which the item can be recorded is defined in the optical disc (step S901). This judgment is realized by specifying an item of information that is allowed to be recorded on the optical disc according to the data format determined in advance for the optical disc, and comparing the specified item with each item of information that makes up the program individual information 420. To be more specific, the command processing unit 330 specifies the data format of the optical disc. As one example method for specifying the data format of the loaded optical disc, the command processing unit 330 may prestore characteristics unique to each data format in association with its data format name, and examine which characteristic the loaded optical disc has, so as to specify the data format.

Examples of the characteristics include data unique to each data format, a data length unique to each data format, a structure unique to an optical disc with each data format, and a data format name recorded on an optical disc with each data format.

Following this, the command processing unit 330 specifies an item of information whose recording detail is defined by the data format of the optical disc. As a method for specifying such an item of information, the command processing unit 330 may prestore each data format in association with a name of an item of information whose recording detail is defined by each data format, and read a name of such an item that is associated with the specified data format, to specify an item of information whose recording detail is defined.

Finally, the command processing unit 330 obtains items of information that make up the program individual information 420, and judges whether each item of information that makes up the program individual information 420 matches the above specified item. As a result of this judgment, an item of information matching the specified item is allowed to be recorded on the optical disc, and an item of information not matching the specified item is not allowed to be recorded on the optical disc.

When judging that such an area is defined in the optical disc, like in the case of the item "recording date and time" ("Yes" in step S901), the command processing unit 330 records the item of information onto the optical disc 372 via the drive controlling unit 360 (step S902).

On the other hand, when judging that such an area is not defined ("No" in step S901), the command processing unit 330 stores the item of information into the information storage buffer 350 (step S903). When all the items of program information transferred from the DTV 110 are either recorded on the optical disc 372 or stored in the information storage buffer 350, the command processing unit 330 transmits a completion message indicating the completion of the processing of the AV/C command, to the DTV 110 via the asynchronous processing unit 320 (step S904).

This completes the process for transferring the items of program information from the DTV 110 to the optical disc recorder 120.

Next, the following describes reading of program information.

Figure 9:
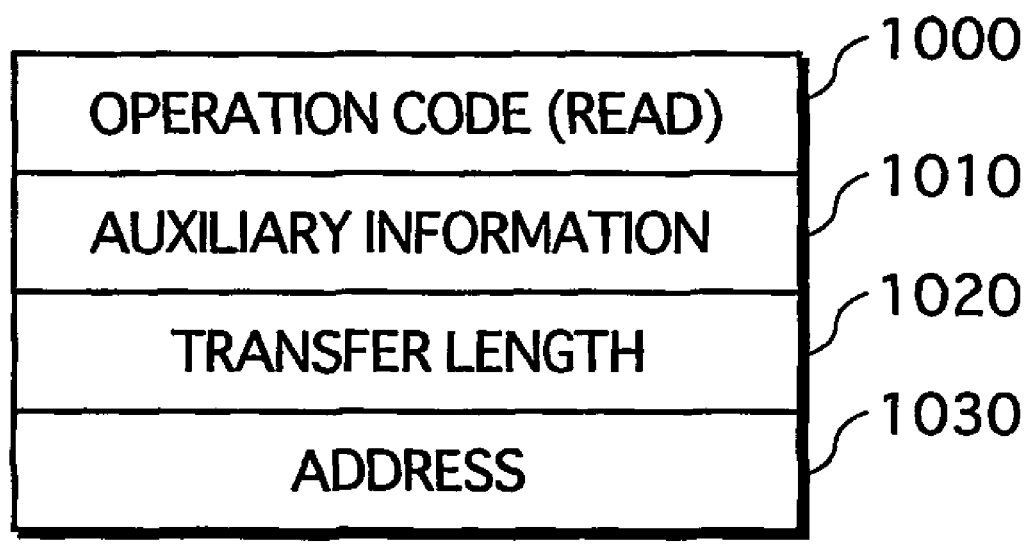
FIG. 9 shows the data structure of an AV/C command that instructs reading.

FIG. 9 shows the data structure of an AV/C command that instructs reading.

As shown in FIG. 9, the AV/C command is made up of an operation code 1000, auxiliary information 1010, a transfer length 1020, and an address 1030. The operation code 1000 indicates the content of the instruction (to read). The auxiliary information 1010 is information relating to the content of the instruction. The transfer length 1020 indicates the size of data to be transferred. The address 1030 indicates a location at which the data to be transferred is stored.

In the same manner as that for the AV/C command that instructs recording described above, this AV/C command is transferred from the DTV 110 to the optical disc recorder 120 as being stored in the command storage area 700 of the FCP format in FIG. 6.

The following describes the processing performed by the optical disc recorder 120, upon receipt of an instruction (AV/C command) to read items of program information transferred using the data structure shown in FIG. 9.

Figure 10:
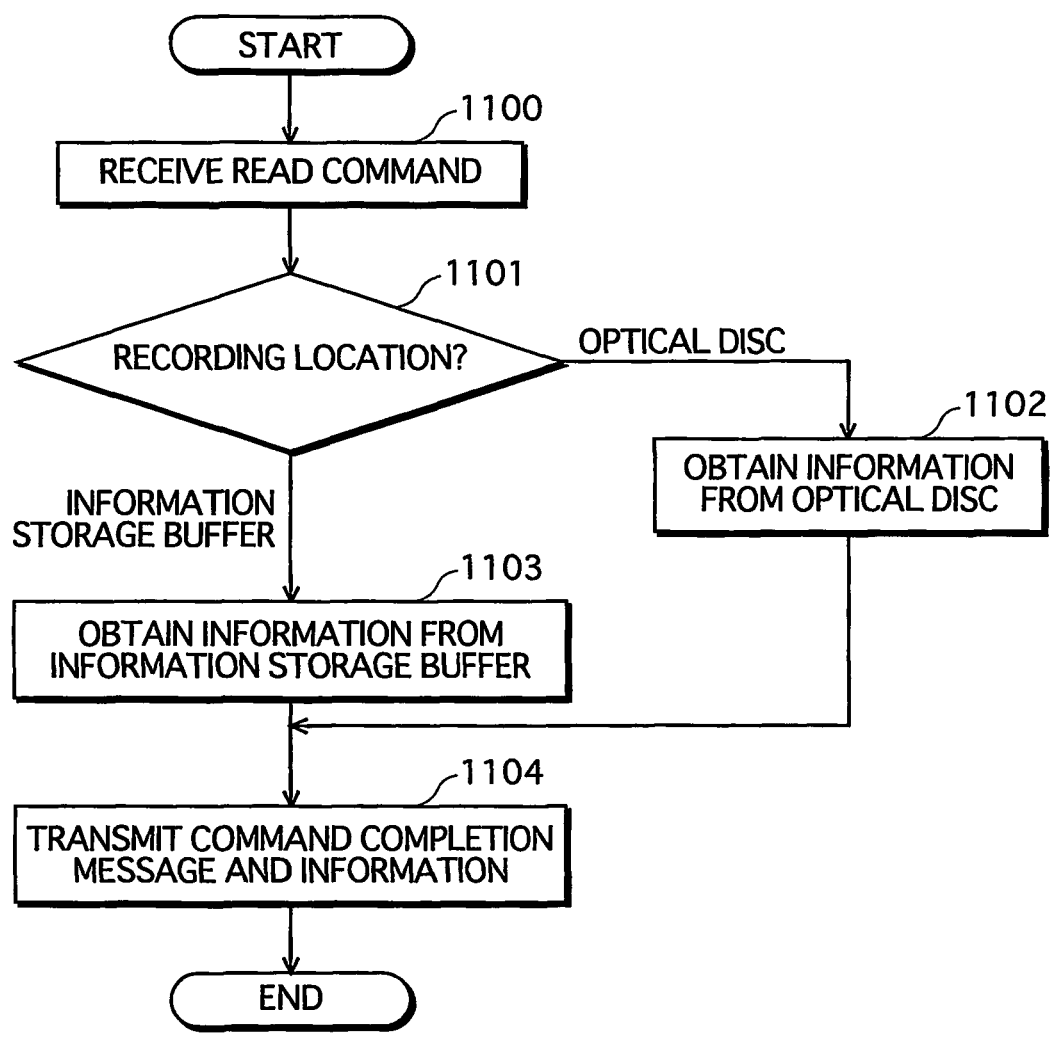
FIG. 10 is a flowchart showing a reading process performed by the optical disc recorder 120 for reading program information.

FIG. 10 is a flowchart showing a reading process performed by the optical disc recorder 120 to read items of program information.

The optical disc recorder 120 receives the AV/C command transferred from the DTV 110, via the asynchronous processing unit 320, and then the command processing unit 330 analyzes the AV/C command (step S1100).

To be more specific, the command processing unit 330 first obtains the AV/C command from the command storage area 700, and analyzes the operation code 1000 etc., to determine which processing is to be performed. Then, the command processing unit 330 judges, for each of the items of the program information indicated by the received AV/C command (namely, the recording date and time 440, the title name 450, and the program outline 460), whether an area in which the item can be recorded is defined in the optical disc (step S1101). This judgment is specifically performed for example in the following way. The command processing unit 330 first specifies the data format of the optical disc 372 that is loaded in the optical disc drive 370. This specification is performed in the same manner as in step 901.

The command processing unit 330 then specifies an item of information whose recording detail is defined by the data format of the loaded optical disc. This specification is also performed in the same manner as in step S901.

The command processing unit 330 next judges whether each item of program information indicated by the received AV/C command matches the above specified item. The command processing unit 330 determines that an item of information matching the specified item is recorded on the optical disc 372, and an item of information not matching the specified item is not recorded on the optical disc 372.

When such an area is defined in the optical disc ("Yes" in step S1101), the command processing unit 330 reads the item of information from the optical disc 372 via the drive controlling unit 360 (step S1102).

On the other hand, when such an area is not defined ("No" in step S1102), the command processing unit 330 reads the item of information from the information storage buffer 350 (step S1103). Upon collecting all the items of program information indicated by the AV/C command in the above-described way, the command processing unit 330 transmits the collected items of program information and a completion message indicating the completion of the processing of the AV/C command, to the DTV 110 via the asynchronous processing unit 320 (step S1104).

Although the present invention is described based on the above embodiment, it should be clear that the present invention is not limited to the above embodiment. For example, the following modifications are possible.

(1) When the optical disc recorder 120 is instructed to read an item of program information recorded neither in the optical disc 372 nor in the information storage buffer 350, i.e., when a recording area for the item of program information is not defined in the optical disc according to its data format and also the item of program information is not stored in the information storage buffer 350, the optical disc recorder 120 may generate pseudo information using information relating to the item. For example, in the case of the item "title name" recorded neither in the optical disc 372 nor in the information storage buffer 350, the optical disc recorder 120 may generate pseudo information using a title number obtained for the corresponding program. For example, the generated pseudo information may be "title 1", "title 2", "title 3", etc., in the order of title names. Further, in the case of the item "program outline" recorded neither in the optical disc 372 nor in the information storage buffer 350, the optical disc recorder 120 may generate pseudo information by obtaining information about the corresponding program from the Internet or the like and extracting only necessary information from the obtained information. By generating such pseudo information, at least some information can be displayed for the user's reference, thereby improving the user convenience. In this way, the process for transferring items of program information from the optical disc recorder 120 to the DTV 110 is completed.

By storing items of information that are not defined by the data format of the optical disc into the information storage buffer as described above, the processing of an AV/C command instructing to record or read items of information whose recording areas are not defined is enabled, thereby avoiding such an AV/C command being ended in error. Therefore, the DTV is enabled to use the same application, regardless of types of mediums to be loaded in the optical disc recorder.

(2) Although the above embodiment describes the case where only a program outline is set as an item of program information whose recording area is not defined in the optical disc, the present invention should not be limited to such. For example, a title name may be set as such an item.

(3) Although the above embodiment describes the case where the controller is a DTV, the present invention should not be limited to such. For example, the controller may be an STB (set top box) connected to a TV via an analog cable.

(4) Although the above embodiment describes the case where the information storage buffer is a memory, the present invention should not be limited to such. For example, the information storage buffer may be realized by an HDD (hard disk drive), or a manufacture's free area or a user data area provided in an optical disc.

(5) Although the above embodiment describes the case where only a program outline is set as an item of program information whose recording area is not defined in the optical disc, the present invention should not be limited to such. For example, a title name, or all the items may be set as such items.

(6) The command processing unit may have the function of applying the same command processing to optical discs with different application formats to be loaded in, instead of performing different command processing for different optical discs. In this case, the optical disc recorder notifies the DTV that the type of the currently loaded medium is uniformly, for example, a "general-purpose recording/playback disc" regardless of the type of the medium. On the other hand, the optical disc recorder may transmit text data showing for example "DVD-RAM" to the DTV, so that the DTV displays the text data, thereby enabling the user to check the type of the loaded medium. As a result of this, the command processing can be simplified without requiring the DTV to change processing depending on types of mediums, and also without confusing the user. As a result of this, burdens on the development efficiency of applications can be alleviated.

(7) Although the above embodiment describes the case where only the DTV and the optical disc recorder are connected to the 1394 bus, the present invention should not be limited to such. For example, an HDD recorder may additionally be connected. In this case, if program information transmitted and received between the DTV and the HDD recorder are identical to program information transmitted and received between the DTV and the optical disc recorder, the DTV can benefit from improved development efficiency of applications.

(8) Although the above embodiment describes the case where data transferred with the use of an AV/C command is program information, the present invention should not be limited to such. For example, such data that indicates settings of devices may be transferred with the use of an AV/C command.

(9) Although the above embodiment describes the case where the recorder uses an optical disc as its recording medium, the present invention should not be limited to such. For example, the recorder may use an HDD as its recording medium.

(10) Although the above embodiment describes the case where the IEEE 1394 is employed as a digital interface, the present invention should not be limited to such. For example, the USB or Ethernet may be employed.

(11) Although the above embodiment describes the case where the optical disc recorder 120 performs a recording process or a reading process on one optical disc, the optical disc recorder 120 may be constructed to perform a recording process or a reading process on a plurality of optical discs.

In this case, at the time of recording program information into the information storage buffer 350, the optical disc recorder 120 obtains a disc identifier (e.g., a serial number) of the currently loaded optical disc 372, and records the disc identifier and the program information into the information storage buffer 350 in such a manner that the disc identifier and the program information are associated with each other. In this way, program information corresponding to each of the plurality of optical discs can be recorded in the information storage buffer 350 as being associated with the corresponding optical disc's identifier.

At the time of reading program information from the information storage buffer 350, the optical disc recorder 120 obtains a disc identifier from the currently loaded optical disc 372, and specifies the program information associated with the obtained disc identifier in the information storage buffer 350, out of the program information recorded therein in association with disc identifies of a plurality of optical discs, and then reads the specified program information from the information storage buffer 350.

The recording device of present invention is useful as a digital recorder that supports reading and writing of data to and from two or more types of removable mediums with different data formats.

The invention claimed is:

1. A recording device for recording items of information onto a removable medium, the recording device comprising:
   a medium unit operable to have the removable medium placed therein;
   an obtaining unit operable to obtain information from an external source;
   a specifying unit operable to specify an item of information that is allowed to be recorded according to a data format of the removable medium placed in the medium unit, the item of information being allowed to be recorded based on a predefined recording admissibility of the item of information; and
   a recording unit operable to judge whether an item of the information obtained by the obtaining unit matches the item of information specified by the specifying unit, and record the obtained information onto (i) the removable medium placed in the medium unit when it is judged that the item of the information obtained by the obtaining unit does match the item of information specified by the specifying unit, and (ii) another medium when it is judged that the item of the information obtained by the obtaining unit does not match the item of information specified by the specifying unit.

2. The recording device of claim 1, further comprising:
   an instruction obtaining unit operable to obtain, from the external source, an instruction to read predetermined information; and
   a reading unit operable to output, to the external source, the predetermined information by reading the predetermined information (i) from the removable medium placed in the medium unit when the predetermined information is recorded on the removable medium placed in the medium unit, and (ii) from the other medium when the predetermined information is not recorded on the removable medium placed in the medium unit but is recorded on the other medium.

3. The recording device of claim 2, further comprising a pseudo-information generating unit operable to generate pseudo information and output the pseudo information, in place of the predetermined information, to the external source, when the predetermined information is not recorded on the removable medium placed in the medium unit or the other medium.

4. The recording device of claim 3, wherein the pseudo-information generating unit is operable to generate the pseudo information based on information recorded on the removable medium placed in the medium unit or the other medium.

5. The recording device of claim 2, further comprising a notifying unit operable to output a notification signal to the external source after the recording unit completes recording onto the removable medium placed in the medium unit or the other medium, the notification signal indicating that the recording unit has completed the recording.

6. The recording device of claim 2, wherein a type of the removable medium to be placed in the medium unit is at least one of a DVD-RAM, a DVD-R, a DVD-ROM, and a DVD-RW.

7. The recording device of claim 2, wherein a signal is transmitted to and received from the external source via a digital interface.

8. The recording device of claim 7, wherein the digital interface is one of an IEEE 1394 interface, a USB interface, and an Ethernet interface.

9. The recording device of claim 2, wherein the other medium is one of a flexible disk, a hard disk, a magneto-optical disk, and a semiconductor memory.

10. The recording device of claim 2, further comprising a disc identifier obtaining unit operable to obtain a disc identifier of the removable medium placed in the medium unit, when the recording unit records onto the other medium,
    wherein, when the recording unit records, onto the other medium, the obtained information having the item that is judged to not match the item of information specified by the specifying unit, the recording unit records the obtained item of information in association with the disc identifier obtained by the disc identifier obtaining unit.

11. The recording device of claim 10, wherein:
    the disc identifier obtaining unit is operable to obtain the disc identifier of the removable medium placed in the medium unit, when the reading unit reads the predetermined information from the other medium; and
    when the predetermined information is not recorded on the removable medium placed in the medium unit, the reading unit is operable to (i) search the other medium for the predetermined information recorded in association with the disc identifier obtained by the disc identifier obtaining unit by using the obtained disc identifier as a key, and (ii) read and output the predetermined information when the search indicates that the predetermined information is recorded on the other medium.

12. A recording method for recording items of information onto a removable medium, the recording method comprising:
    placing the removable medium into a medium unit;
    obtaining information from an external source;
    specifying an item of information that is allowed to be recorded according to a data format of the removable medium placed in the medium unit, the item of information being allowed to be recorded based on a predefined recording admissibility of the item of information; and
    judging whether an item of the information obtained in the obtaining of the information matches the item of information specified in the specifying of the item of information, and recording the obtained information onto (i) the removable medium placed in the medium unit when it is judged that the item of the information obtained by the obtaining of the information does match the item of information specified by the specifying of the information, and (ii) another medium when it is judged that the item of the information obtained by the obtaining of the information does not match the item of information specified by the specifying of the information.

13. The recording method of claim 12, further comprising:
    obtaining, from the external source, an instruction to read predetermined information; and
    outputting, to the external source, the predetermined information by reading the predetermined information (i) from the removable medium placed in the medium unit when the predetermined information is recorded on the removable medium placed in the medium unit, and (ii) from the other medium when the predetermined information is not recorded on the removable medium placed in the medium unit but is recorded on the other medium.

14. The recording method of claim 13, further comprising generating pseudo information and outputting the pseudo information, in place of the predetermined information, to the external source, when the predetermined information is not recorded on the removable medium placed in the medium unit or the other medium.

15. The recording method of claim 14 wherein, in the generating of the pseudo information, the pseudo information is generated based on information recorded on the removable medium placed in the medium unit or the other medium.

16. The recording method of claim 13, further comprising obtaining a disc identifier of the removable medium placed in the medium unit, when the recording of the obtained information records the obtained information onto the other medium, wherein, when the recording of the obtained information records, onto the other medium, the obtained information having the item that is judged to not match the item of information specified in the specifying of the item of information, the recording of the obtained information records the obtained information in association with the disc identifier obtained in the obtaining of the disc identifier.

17. The recording method of claim 16, wherein:

in the obtaining of the disc identifier, the disc identifier of the removable medium placed in the medium unit is obtained when the outputting of the predetermined information reads from the other medium; and when the predetermined information is not recorded on the removable medium placed in the medium unit in the reading of the predetermined information, (i) the other medium is searched for the predetermined information recorded in association with the disc identifier obtained in the obtaining of the disc identifier by using the obtained disc identifier as a key, and (ii) the predetermined information is read and outputted when the search indicates that the predetermined information is recorded on the other medium.

18. The recording device of claim 1, wherein the data format relates to a plurality of meta-data associated with a broadcast program.

19. The recording device of claim 18, wherein the meta-data contains at least one of a title name, a recording date, a recording time, and a program outline of the broadcast program.

* * * * *